June 9, 1931.  S. MARCUS ET AL  1,809,053
DOLL EYE MOUNTING
Filed July 10, 1928  2 Sheets-Sheet 1
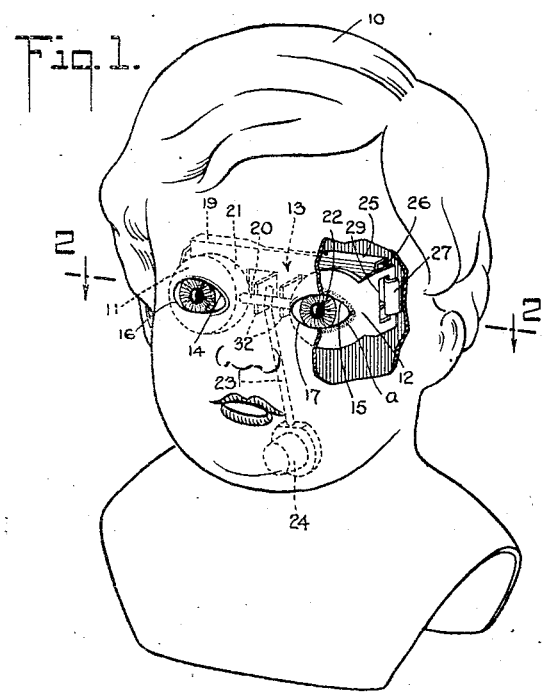
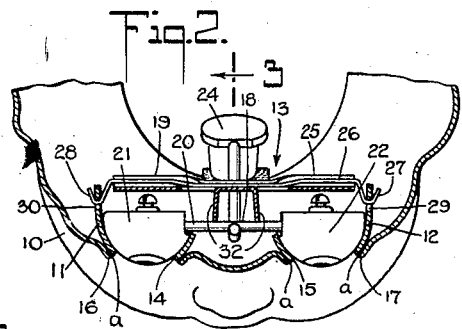
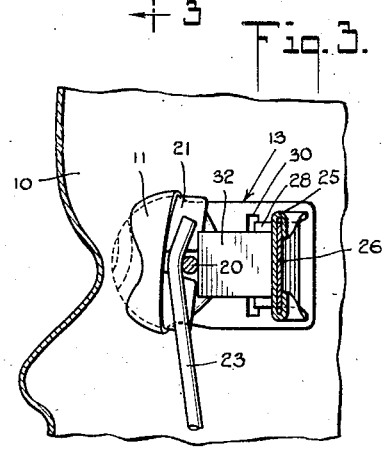
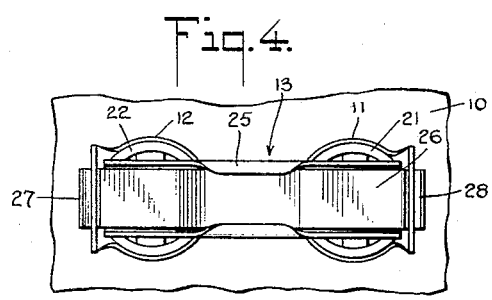
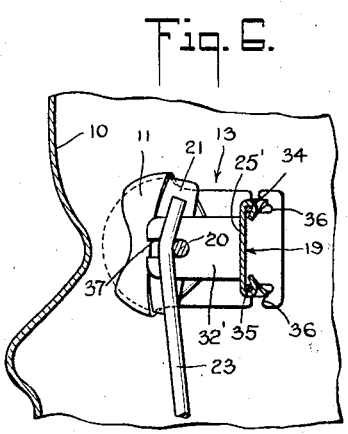
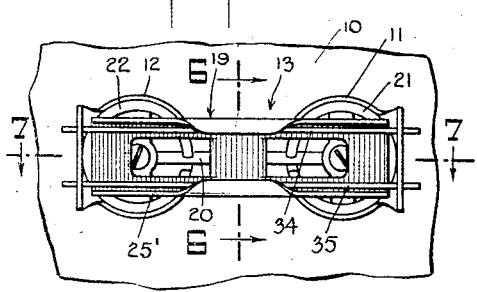
INVENTORS
SAMUEL MARCUS and
ALEXANDER KONOFF
BY
ATTORNEYS June 9, 1931. S. MARCUS ET AL 1,809,053
DOLL EYE MOUNTING
Filed July 10, 1928 2 Sheets-Sheet 2
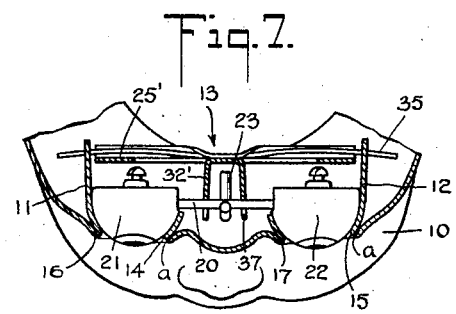
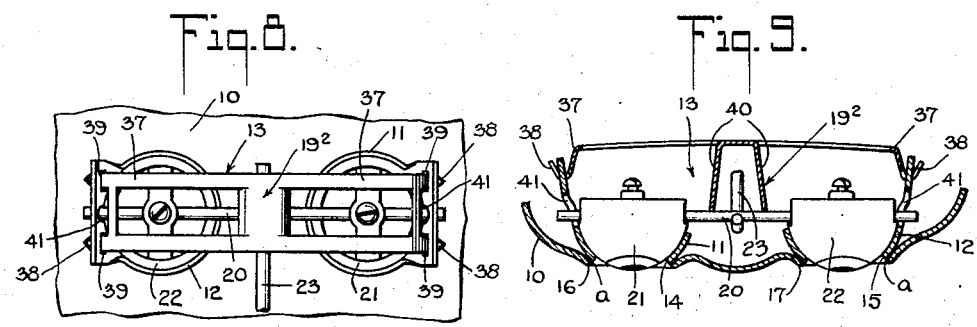
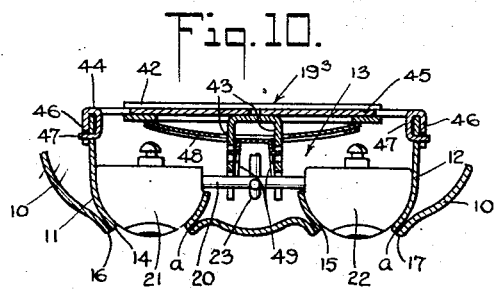
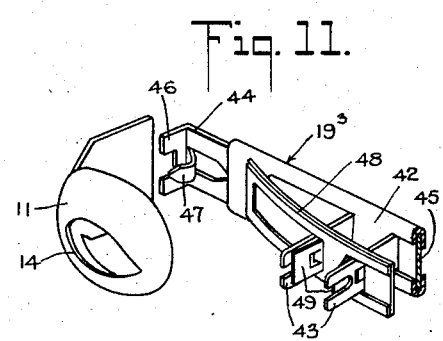
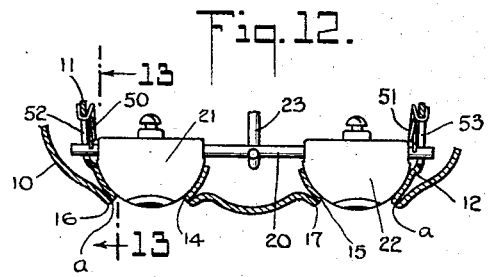
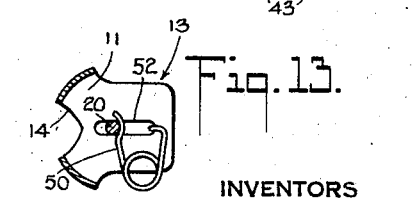
INVENTORS
SAMUEL MARCUS and
ALEXANDER KONOFF
BY
ATTORNEYS Patented June 9, 1931

1,809,053

UNITED STATES PATENT OFFICE

SAMUEL MARCUS, OF BROOKLYN, AND ALEXANDER KONOFF, OF NEW YORK, N. Y., ASSIGNORS TO MARKON MANUFACTURING CO. INC., OF NEW YORK, N. Y., A CORPORATION OF NEW YORK

DOLL EYE MOUNTING

Application filed July 10, 1928. Serial No. 291,635.

This invention relates to the art of mounting movable eye sets in dolls' heads; and has special reference to the provision of a resilient mounting for such movable eye sets supported solely at the eye openings of the doll's head.

The principles of our present invention are particularly applicable to the mounting of dolls' eyes or eye sets in translucent or semitransparent dolls' heads such as are made, for example, from transparent celluloid and other cellulose derivatives; and the prime desideratum of our present invention centers about the provision of a resilient mounting for movable dolls' eyes or eye sets so attached to and supported within the doll's head as to render the interior construction of both the mounting and the eye set substantially invisible through the semi-transparent or translucent walls of the doll's head.

The present invention is directed more particularly to improvements in the doll eye mounting disclosed and claimed in our copending application, Serial No. 254,986, filed February 17, 1928. In this copending application, we disclose a mounting for dolls' eyes or eye sets particularly adapted for translucent or transparent dolls' heads in which a number of difficulties met with in supporting the mountings on the interior walls of the doll's head at points either close to or remote from the eye openings of the head are substantially and entirely obviated and in which the eye mountings are so attached to the doll's head as to produce an accurate and workable fitting of the eye at the eye openings of the head combined with the substantial elimination of any visibility or perceptibility of the mounting or eye set structure through the translucent walls of the doll's head. To accomplish these results, the eye mounting of the invention as disclosed in this copending application comprises socket members affixed to the eye openings of the doll's head solely at the rims or edges of the eye openings and a carrier for the eye members supported by and carried on said socket members, the construction being such that the structures of the socket members and eye set and carrier therefor are substantially invisible through the walls of the translucent doll's head.

The prime objects of our present invention center about the provision of an improved eye mounting of this character in which the eye set is resiliently and flexibly supported in the eye sockets or socket members so that the eye members or eye sets may automatically adjust themselves in the eye sockets to closely fit therein without any binding or "sticking" tendency during substantially all distortion producing variations in the doll's head structure. Dolls' heads, when made of a thin cellulose product, exhibit variations in shape or configuration which are incident to the flexibility and resiliency of the walls of the doll's head and which are largely the result of inherent shrinkage and temperature and atmospheric effects. As a consequence of these factors, it is highly desirable in mounting the eye set in the doll's head to provide means for compensating for physical variations in the configurations of the doll's head in a way to permit an automatic adjustment of the eye members in the supporting socket members provided therefor so that these eye members will, at all times, snugly fit and oscillatingly move within the socket members without any binding action or any tendency to "stick" to the walls of the socket members.

A further prime object of the present invention is directed to the provision of a resilient mounting for eye sets which not only permits of a compensating self-adjustment of the eye members within the socket members, but also yields a structure capable of being set up in mounted condition with ease by production methods and with the use of unskilled help. In mounting the eye set, so as to be supported wholly on the socket members, difficulty is sometimes experienced in locating the points of support for the eye set so that both of the eye members thereof will accurately fit the respective sockets provided therefor. Any relative movement of the socket members due to a distortion producing variation of the doll's head disturbs the relative positions of these points of support and therefore is a factor in causing an ultimate mal-adjustment of the eye sets with respect to the sockets. It is a further prime object of the invention, therefore, to so design the eye mounting as to produce a resilient mounting for the eye set which is floatingly, and yet resiliently, supported in the eye socket members so arranged as to permit a self-adjustment of the mounting in the sockets members at the points of support thereof. With such a construction, the initial exact location of the points of support becomes a matter of secondary importance, thus permitting of more rapid assembly methods in the hands of an unskilled operative and further permits the compensating self-adjustment due to the variations referred to.

While we show the principles of our invention exemplified with dolls made of a cellulose material, it will be understood that the improved resilient doll's eye mounting of our present invention is adapted for dolls' heads made of other materials wherein similar problems are involved; and that therefore, the various embodiments of the invention herein described are shown by way of exemplification and not by way of limitation, the advantages of the invention being best seen by the applications thereof to dolls' heads made of a thin stock such as a celluloidal material.

To the accomplishment of the foregoing and such other objects as will hereinafter appear, our invention consists in the elements and their relation one to the other, as hereinafter more particularly described and sought to be defined in the claims; reference being had to the accompanying drawings which show the preferred embodiment of our invention, and in which:

Fig. 1 is a perspective view of a doll's head showing the mounting of our invention applied thereto with a part of the head broken away to show the interior construction of the mounting;

Fig. 2 is a view thereof taken in cross-section in the plane of the line 2—2, Fig. 1;

Fig. 3 is a fragmentary view thereof taken in cross-section in the plane of the line 3—3, Fig. 2;

Fig. 4 is a rear elevational view of the same;

Fig. 5 is a rear elevational view of a modified form of the invention;

Fig. 6 is a view of this modification shown in cross-section in the plane of the line 6—6, Fig. 5;

Fig. 7 is a view thereof taken in cross-section in the plane of the line 7—7, Fig. 5;

Figs. 8 and 9 are rear and horizontal cross-sectional views respectively of another modification of the invention;

Figs. 10 and 11 are horizontal cross-sectional and perspective views respectively of a still further modification of the invention; and Figs. 12 and 13 are views of a further embodiment of the invention, Fig. 12 being a horizontal cross-sectional view; and Fig. 13 a view taken in cross-section of the plane 13—13, Fig. 12.

Referring now in more detail to the drawings and having reference first to Figs. 1 to 4 thereof, we show our invention applied to a doll's head 10 made of a relatively thin body of semi-transparent or translucent material, such, for example, as transparent celluloid or other cellulose derivatives treated to produce an imitation of the naturalness or tint of the human skin. These cellulose dolls' heads may be made to simulate natural and life-like tints characteristic of the human skin, the appearance of which, however, is materially marred by the casting of shades or shadows on the interior walls thereof from any structural elements which may be mounted within the same. These marring shades and shadows caused for example by eye mountings or supports within the doll's head are particularly pronounced when the doll's head is held up to the light. When the eye mountings or supports are affixed interiorly to the walls of the doll's head, such for example, as at the forehead, nose or cheek portions thereof, the attachment becomes visible through the walls of the head and results in a gross disfiguration of the head and facial appearance thereof.

In accordance with our present invention, the eye set and mounting therefor are so organized and attached to and supported within the doll's head as to substantially eliminate all of the undesirable shades and shadows and visible points of attachment. This we accomplish by providing an eye mounting comprising eye socket members 11 and 12 attached to the doll's head 10 solely at the rims of the eye openings thereof and supporting a carrier and a movable eye set generally designated as 13 supported in said eye socket members 11 and 12, the socket members 11 and 12 being so attached to the doll's head as to make contact with said head solely at the rims or edges of the eye openings thereof and preferably by attaching means which is confined in area to the rims or edges of said openings.

More specifically, the socket members 11 and 12, preferably made of a material similar to that of the doll's head 10 and forming a relatively thin body produced in shell formation so as to be neatly and snugly fitted by the eye members of the eye set, are provided with openings 14 and 15 respectively, cut in size and contour to correspond to the eye openings 16 and 17 of the doll's head; and these socket members are attached interiorly of the doll's head by arranging the openings 14 and 15 of the socket members in aligning registry with the eye openings 16 and 17 of the head and by then attaching the same to the doll's head at the rims only of said registering openings by attaching means such as a suitable adhesive $a$ which, as shown in Figs. 1 and 2 of the drawings, is confined in area to the rims or edges of said registering openings, said adhesive or binder extending encirclingly about the meeting edges of said openings. The socket members 11 and 12 are furthermore so shaped, as shown in the drawings, that the walls thereof are spaced from the walls of the doll's head 10 except at the rims of the registering openings; and by means of this construction and method of mounting, it will be seen that the points of attachment are confined to the edges of the eye openings and are eliminated from all other points or regions of the doll's head.

The carrier and eye set 13 of the invention comprises an eye set 18 and a holder 19 therefor, the said holder being anchored to the socket members 11 and 12 and being active on said eye set to resiliently support the same with relation to the socket members. The eye set proper preferably comprises a structure such as is shown, for example, in the patent to A. Konoff, No. 1,566,105 of December 15, 1925, and consists of a cross rod 20 carrying eye members 21 and 22 longitudinally adjustable thereon to which cross rod is centrally welded a weight arm 23 carrying the weight of gravity element 24. The eye members 21 and 22 are supported by and contact with the walls of the socket members 11 and 12. The resilient holder 19 may take any of a variety of forms as hereinbelow further detailed, and functions by being active on one or more parts of the eye set 18 to cause the eye members thereof to be floatingly and resiliently supported in the socket members, the eye members being mounted for a free rearward movement in the sockets and the resilient holder being constructed to urge the eye members resiliently forward into snugly seating relation in the socket members. The relation between the eye set 18 and the holder 19 is, moreover, such that either eye member 21 or 22 is independently movable for compensating adjustment within its socket member.

In the preferred forms of construction of the resilient holder 19 the same is made to comprise a bridge member which spans the socket members 11 and 12 and thus provides a transverse bracing member for the socket members which produces not only an efficient support for the eye set but a strengthened assembly or organization of parts.

In the form shown in Figs. 1 to 4 of the drawings, this bridge member comprises a top and bottom flanged plate 25 having the central portions of the flanges thereof turned down to anchor a leafspring bridge member 26 which latter is provided at its opposite ends with hook shaped portions 27 and 28 which are freely received by engaged slots 29 and 30 provided in integral extensions or walls of the socket members 11 and 12, as is clearly shown in the drawings. The plate 25 is provided medially thereof with integral and struck out studs 32 the outer edges of which function to engagingly support the cross rod 20 of the eye set.

The principles of the invention and the advantages thereof will be readily apparent from the form of construction shown in these Figs. 1 to 4. In assembling the parts, the eye set 18 which is handled as a unit is mounted with the eye members thereof in supporting engagement with the walls of the socket members after which the resilient bridge member 19 is slipped into position by first engaging one hook thereof in a slot of one of the socket members and by then slipping or pressing the other hook thereof into receiving engagement with the slot in the other socket member. The bridge member 19 loosely and resiliently floats in the socket members 11 and 12 and therefore compensatingly adjusts itself with all variations of configurations of the doll's head structure. Due to this floating resilient carriage of the bridge member the initial matching or alignment of the slots 29 and 30 in the socket members becomes of minimum importance. The bridge member flexibly and resiliently engages the cross rod 20 medially thereof so that the eye members 21 and 22 are each independently capable of self adjusting movement in the socket members. Not only is each of the eye members urged resiliently forward in its socket, but the eye set as a whole is capable of substantially universal movement, the rod 20 thereof being free to move in a vertical plane and rotatively within limits about a central vertical axis. The bridge carrier 19 is capable of a similar universal self adjustment. It has been found that with the construction described, the eye members maintain a snug and movable fit in the sockets during long periods of service.

In the modification shown in Figs. 5 to 7 of the drawings wherein parts similar to those shown in Figs. 1 to 4 of the drawings are indicated by similar reference characters, the bridge carrier 19 comprises a plate 25' similar to that heretofore described, the flanges of which are medially inturned to anchor a pair of spring wires 34 and 35, the ends of which are received by and journalled in bayonet-like slots 36, 36 provided in the opposing walls of the eye socket members 11 and 12. In this form of the invention, the struck out supports 32' of the plate 25' are slitted as at 37 to receive the cross rod 20 of the eye set. This form of bridge member 19 is also receivably mounted in the eye socket members and performs, together with the eye sets, substantially the same functions as those heretofore set forth in connection with the form of the invention shown in Figs. 1 to 4.

In Figs. 8 and 9 of the drawings, we show a still further modification of the bridge carrier 19² which comprises a resilient element made of a single piece of sheet material. This resilient element 19² comprises bridge arms 37, 37 terminating in integral hooks 38, 38 which are received by apertures 39, 39 formed in the opposing walls of the eye socket members, the bridge member further including the integral struck out supports 40, 40 which serve to engage the cross rod 20. If desired, the cross rod 20 may independently be carried by the eye socket members and to this end, the cross rod is made of an extended length the ends of which are loosely received by slots 41, 41 in the walls of the eye socket members 11 and 12. This form of bridge carrier 19² possesses the advantages which characterize those already described and, in addition, possesses the advantage first of yielding an inexpensive one piece structure and second, of producing a spanning element for the eye socket members which, due to the spring action thereof, effects a desirable securing connection between the walls of the socket members.

In Figs. 10 and 11 of the drawings, we show a still further modification of the invention in which the carrier is rigidly attached to the eye socket members, the resilient means being interposed between the carrier and the eye set and in which the points of support on the socket members for the carrier are made when the carrier is mounted into position. The parts of the construction similar to those heretofore described are designated by similar reference characters. The carrier indicated generally as 19³ comprises a plate 42 having integral rod supports 43, the said plate having its top and bottom edges channelled to adjustably receive two attaching elements 44, 45 which are adjustable to suit the dimensions of an eye set. Each of the attaching elements (44 and 45) is provided with securing means which, before attachment to the eye socket members, take the form shown in Fig. 11 and which include a forked flange member 46 and a hook shaped element 47. The resilient means of the carrier comprises a leaf spring 48 bearing at its opposite ends on the plate 42, the said leaf spring being provided integrally with outstanding presser fingers 49, 49 which engage directly with the cross rod 20 to resiliently urge the same into position. In mounting this carrier 19³ in position, the carrier is attached to the opposing walls of the socket members by forcing hook elements 47, 47 into piercing engagement with the walls of the socket members as fully shown in Fig. 10 of the drawings.

In this modification of Figs. 10 and 11 of the drawings, the position of the carrier 19³ is predetermined by fixing the length or depth of the opposing walls of the socket members 11 and 12, the carrier being positioned so that the eye set is floatingly held in the supports 43 resiliently urged by the spring fingers 49. The means for exactly determining the position of the carrier comprises the rear edges of the opposing walls of the socket members seated in the angle or bend of the attaching elements 44 and 45.

In the modification of the invention shown in Figs. 12 and 13 of the drawings, wherein parts similar to those heretofore described are designated by similar reference characters, the bridge construction is eliminated and the resilient holder for the eye set is made to comprise means which resiliently support the eye set directly in the walls of the socket members. This may be accomplished by the provision of a pair of coil springs 50, 51 each having one end bearing against an end of the cross rod 20 and another end anchored in a slot provided in the wall of the eye socket member, the eye socket member 11 having a slot 52 and the eye socket member 12 having a slot 53 for this purpose. The cross rod 20 is extended so as to be received and supported by these anchoring slots 52 and 53.

The use and operation of the eye mounting of our present invention in the various forms disclosed and the main advantages thereof will, in the main, be fully apparent with the above detailed description thereof. It will be further apparent that while we have shown and described our invention in the preferred form, many changes and modifications may be made in the structure disclosed without departing from the spirit of the invention defined in the following claims.

We claim:

1. In combination, a doll's head having eye openings, eye socket members attached to said head at said openings, each of said socket members being adapted to receive and supportingly house an eye member, an eye set including a pair of eye members, and means for movably mounting said eye members in said socket members, said means comprising a resilient holder anchored to said socket members and active on said eye set to resiliently support the same with relation to said socket members.

2. In combination, a doll's head having eye openings, eye socket members affixed to said doll's head and having openings registering with said eye openings thereof, each of said socket members being adapted to receive and supportingly house an eye member, an eye set including a pair of eye members floatingly supported in said socket members for a free rearward movement relatively thereto, and means for oscillatably mounting said eye set in said socket members, said means comprising a resilient member anchored to said socket members and active on said eye set to resiliently urge the same forwardly in said socket members.

3. In combination, a doll's head having eye openings, eye socket members attached to said head at said openings, each of said socket members being adapted to receive and supportingly house an eye member, an eye set having spaced eye members, one for each eye opening and socket member, said eye set being floatingly supported for a free rearward movement in said socket members, and means for oscillatably mounting said eye set in said socket members, said means comprising a resilient holder anchored to said socket members and active on said eye set to resiliently urge the eye members thereof jointly and severally into said sockets.

4. In combination, a doll's head having eye openings, eye socket members affixed to said doll's head and having openings registering with said eye openings thereof, each of said socket members being adapted to receive and supportingly house an eye member, an eye set including a cross rod and spaced eye members thereon, said eye members fitting into said socket members, and means for oscillatably mounting said eye set in said socket members, said means comprising a resilient holder detachably anchored to said socket members and active medially on said rod to resiliently support the eye set with relation to said socket members.

5. In combination, a doll's head having eye openings, eye socket members affixed to said head at said openings, an eye set, and means for movably mounting said eye set in said socket members, said means comprising a resilient bridge member spanning said eye socket members and carried thereby, the said bridge member being active on said eye set to resiliently support the same with relation to said socket members.

6. In combination, a doll's head having eye openings, eye socket members affixed to said head at said openings, an eye set, and means for oscillatably mounting said eye set in said socket members, said means comprising a bridge member spanning the outside walls of said eye socket members and carried thereby, the said bridge member including resilient means active on said eye set to resiliently urge the same toward said socket members.

7. In combination, a doll's head having eye openings, eye socket members affixed to said head at said openings, an eye set, and means for movably mounting said eye set in said socket members, said means comprising a resilient bridge member spanning said eye socket members and detachably carried thereby.

8. In combination, a doll's head having eye openings, eye socket members affixed to said dolls' head and having openings registering with said eye openings thereof, an eye set having spaced eye members fitting into and contacting with the walls of said socket members, said eye set being floatingly supported in said socket members for a free rearward movement therein, and means for oscillatably mounting said eye set in said socket members, said means comprising a bridge member spanning said eye socket members and carried thereby, the said bridge member including resilient means active on said eye set to resiliently urge the same forwardly into said socket members.

9. In combination, a doll's head having eye openings, eye socket members attached to said head at said openings, an eye set including a cross rod and spaced eye members thereon, said eye members fitting into said socket members, and means for oscillatably mounting said eye set in said socket members, said means comprising a resilient bridge member spanning said eye socket members and carried thereby, the said bridge member being active medially on said rod to resiliently support the eye set in said socket members.

10. In combination, a translucent doll's head made of thin stock and provided with eye openings, eye socket members also made of a thin stock and provided with openings registering with said eye openings, said socket members being attached to said doll's head solely at the rims of said registering openings, an eye set, and means for movably mounting said eye set in said socket members, said means comprising a resilient holder carried by said socket members and active on said eye set to resiliently support the same with relation to said socket members.

11. In combination, a translucent doll's head made of thin stock and provided with eye openings, eye socket members separate from the doll's head and also made of a thin stock and provided with openings registering with said eye openings, said socket members being attached to said doll's head solely at the rims of said registering openings, the attachment being along lines confined in area to the rims or edges of said openings, an eye set, and means for movably mounting said eye set in said socket members, said means comprising a resilient holder carried by said socket members and active on said eye set to resiliently support the same with relation to said socket members.

12. In combination, a translucent doll's head made of thin stock and provided with eye openings, eye socket members separate from the doll's head and also made of a thin stock and provided with openings registering with said eye openings, said socket members being attached to said doll's head solely at the rims of said registering openings, the attachment being along lines confined in area to the rims or edges of said openings, an eye set, and means for movably mounting said eye set in said socket members, said means comprising a resilient bridge member carried by said socket members and active on said eye set to resiliently urge the same into said socket members.

13. In combination, a doll's head made of celluloid and forming a thin translucent body provided with eye openings, eye socket members also made of a material forming a thin body and having openings registering with said eye openings, said socket members being attached to and making contact with said doll's head solely at the rims of said registering openings, an eye set, and means for movably mounting said eye set in said socket members, said means comprising a resilient holder carried solely by said socket members and active on said eye set to resiliently support the same with relation to said socket members, the construction being such that the structures of the socket members, eye set and holder are substantially invisible through the walls of the translucent doll's head.

14. In combination, a doll's head made of celluloid and forming a thin translucent body provided with eye openings, eye socket members also made of a material forming a thin body and having openings registering with said eye openings, said socket members being attached to and making contact with said doll's head solely at the rims of said registering openings, an eye set, and means for movably mounting said eye set in said socket members, said means comprising a resilient bridge carried solely by said socket members and active on said eye set to resiliently support the same with relation to said socket members, the construction being such that the structures of the socket members, eye set and bridge are substantially invisible through the walls of the translucent doll's head.

15. In combination, a doll's head made of celluloid and forming a thin translucent body provided with eye openings, eye socket members also made of a material forming a thin body and having openings registering with said eye openings, said socket members being attached to and making contact with said doll's head solely at the rims of said registering openings, an eye set including a cross rod and spaced eye members thereon, and means for movably mounting said eye set in said socket members, said means comprising a resilient holder carried solely by said socket members and active medially on said rod to resiliently support the eye set with relation to said socket members, the construction being such that the structures of the socket members, eye set and holder are substantially invisible through the walls of the translucent doll's head.

16. In combination, a doll's head having eye openings, a movable eye set including a cross member and spaced eyes therein, and eye set supporting means provided in the doll's head adjacent each of the side walls thereof the normal distance between which is different from the normal length of the cross member, said cross member and supporting means being relatively resilient so that the cross member may be pushed into supporting relation with the supporting means.

17. In combination, a doll's head having eye openings, a movable eye set including a cross member and spaced eyes therein, and eye set supporting means provided in the doll's head at each side thereof adjacent the outer wall of each of the eye openings, the normal distance between said supporting means being less than the normal length of the cross member, and said cross member and supporting means being relatively resilient so that the cross member may be pushed into supporting relation with the supporting means.

18. In combination, a doll's head having eye openings, a movable eye set including a cross member, spaced eyes thereon, and means resiliently urging said eyes toward said eye openings, and eye set supporting means provided in the doll's head at each side thereof adjacent the outer wall of each of the eye openings the normal distance between which is different from the normal length of the cross member, said cross member and supporting means being relatively resilient so that the cross member may be pushed into supporting relation with the supporting means.

Signed at New York, in the county of New York and State of New York, this 3 day of July, A. D. 1928.

SAMUEL MARCUS.
ALEXANDER KONOFF.